United States Patent [19]

Sehier

[11] Patent Number: 4,949,357
[45] Date of Patent: Aug. 14, 1990

[54] SYNCHRONIZING CIRCUIT FOR OFFSET QUATERNARY PHASE SHIFT KEYING

[75] Inventor: Philippe Sehier, Levallois Perret, France

[73] Assignee: Alcatel N.V., Amsterdam, Netherlands

[21] Appl. No.: 323,411

[22] Filed: Mar. 14, 1989

[30] Foreign Application Priority Data

Mar. 15, 1988 [FR] France ................. 88 03334

[51] Int. Cl.$^5$ ............................................. H03D 3/24
[52] U.S. Cl. ...................................... 375/86; 375/120; 329/307
[58] Field of Search ........................ 375/42, 80, 83, 84, 375/85, 86, 87, 94, 119, 120; 329/304, 307, 313, 319, 325; 370/12, 105.3

[56] References Cited

U.S. PATENT DOCUMENTS

| | | | |
|---|---|---|---|
| 3,806,815 | 4/1974 | Fletcher et al. | 375/86 |
| 4,027,265 | 5/1977 | Kobayashi et al. | 375/85 |
| 4,092,606 | 5/1978 | Ryan | 329/124 |
| 4,313,205 | 1/1982 | Rhodes | 375/86 |
| 4,314,206 | 2/1982 | Attwood et al. | 329/50 |
| 4,438,524 | 3/1984 | Muilwijk | 375/85 |
| 4,538,111 | 8/1985 | Giusto | 375/86 |
| 4,847,869 | 7/1989 | Labedz et al. | 375/85 |

Primary Examiner—Benedict V. Safourek
Assistant Examiner—Stephen Chin
Attorney, Agent, or Firm—Christie, Parker & Hale

[57] ABSTRACT

A synchronizing circuit for offset quaternary phase shift keying, comprises: a four-phase demodulator 10; a processing module (11, 12); and a phase error calculating circuit (15) followed by a phase correcting circuit (16) which delivers a phase error correction signal. The invention is applicable to telecommunications by microwave beams.

7 Claims, 2 Drawing Sheets

SYNCHRONIZING CIRCUIT FOR OFFSET QUATERNARY PHASE SHIFT KEYING

The invention relates to a synchronizing circuit for offset quaternary phase shift keying.

BACKGROUND OF THE INVENTION

The invention relates to coherent demodulation of signals which have been modulated using offset quaternary phase shift keying (OQPSK), which class of keying includes the important case of minimum shift keying (MSK).

This type of keying is being used more and more for microwave beam transmission since it offers important advantages, including the advantage of presenting a constant envelope.

The circuit of the invention makes it possible to obtain the phase synchronization required for coherent demodulation in a manner which is effective and simple. The quality of such a circuit has an important influence on the performance of a receiver in terms of error rate.

Phase synchronization for OQPSK type systems gives rise to problems that do not exist in other comparable keying systems (e.g. QPSK and BPSK=Binary Phase Shift Keying).

There are several types of circuit for achieving phase synchronization with this OQPSK class of keying.

The most closely-related types are referred to as follows:

DD: "Decision Directed"
   In which decisions concerning the symbols are used when calculating the error signal for servo-controlling the loop; and NDD: "Non-decision Directed"
   In which such decisions are not used.

An NDD circuit provides performance which is less good than a DD circuit (using the criterion of residual variance in phase error).

The circuit of the invention makes use of decisions and is therefore designated below as:

MDD: "Modified Decision Directed".

In DD and in NDD circuits, there remains a degree of residual phase error noise of non-thermal origin which cannot be reduced for given loop bandwidth. In other words, when the signal-to-noise ratio tends towards infinity, there remains non-zero fluctuation in the phase error which gives rise to a residual error rate.

This residual noise can be reduced to an arbitrary extent by reducing the loop bandwidth, but that prevents the system from tracking random keying which is mostly due to the local oscillators at the transmission end and at the reception end, and which justifies the use of a wide loop bandwidth which may optionally be adaptive as a function of the signal/noise ratio.

The invention serves to reduce this residual noise very considerably and to eliminate it completely in the special case of MSK.

SUMMARY OF THE INVENTION

The invention thus provides a synchronizing circuit for offset quaternary phase shift keying, and comprising:
  a four-phase demodulator;
  a processing module; and
  a phase error calculating circuit followed by a phase correcting circuit which delivers a phase error correction signal.

Advantageously, the phase loop error voltage is equal to:

$$e^p{}_k = g1(d_{-2} - d_k)y^c{}_{k-1} + d_{k-1} \cdot y^s{}_{k-1}$$

where $y_{k-1}$ is equal to $y_k$ shifted by one bit time, with $y_k = (-j)^k \cdot x_k = y_k{}^c + jy^s{}_{k-1}$, where $x_k$ is the output signal from the demodulator and $d_{k-2}$ and $d_{k-1}$ are the signal $d_k$ shifted by two bit periods and by one bit period respectively, with $d_k$ being the sign of the real path of $y_k$, and $g1 = g(T)$ where T is the bit period and $g(t)$ is the overall impulse response of the filtering to which the signal is subjected.

In a first embodiment of the circuit of the invention, the phase loop error voltage is applied to a VCO via a filter in order to provide analog control to the demodulator.

In a second embodiment, the phase loop error voltage is applied to a multiplier via a filter, a digital integrator delivering a signal $\phi$, and a circuit for calculating $e^{-j\phi}$.

Thus, in particular, the invention provides a phase estimator. Advantageously, multiplication by $(-j)^k$ provides a considerable simplification of this estimator, but that is by no means essential for it to operate properly. In addition, an independent clock recovery loop may be integrated simply in a circuit of the invention.

Thus, and advantageously, the processor module includes a module for multiplying by $(-j)^k$. The clock loop error voltage is equal to: $e_k{}^r = -y^s{}_{k-1} \cdot (d_k + d_{k-2})$ where $y^s{}_{k-1}$ is the imaginary part of $y_{k-1}$, $y_{k-1}$ is the signal $y_k$ shifted by one bit period, $y_k = (-j)^k \cdot x_k$, where $x_k$ is the output signal from the demodulator, and $d_{k-2}$ is the signal $d_k$ shifted by two bit periods and $d_k$ is the sign of the real portion of $y_k$.

BRIEF DESCRIPTION OF THE DRAWINGS

Embodiments of the invention are described by way of example with reference to the accompanying drawings, in which.

DETAILED DESCRIPTION

Figure 1:
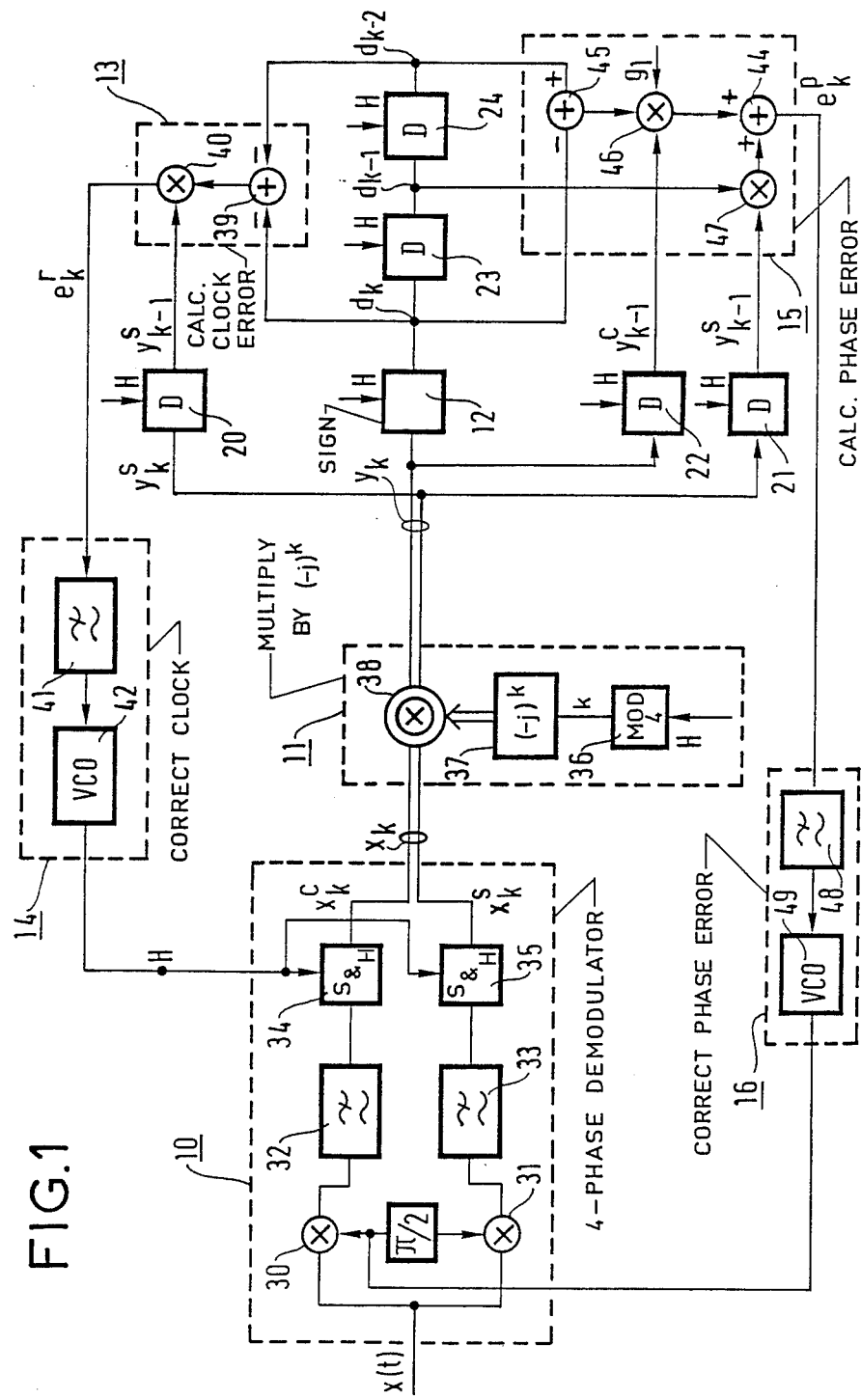
FIG. 1 is a block diagram of a circuit in accordance with the invention.

As shown in FIG. 1, a circuit in accordance with the invention comprises:
  a demodulator 10 which is a four-phase demodulator;
  a processor module comprising a module 11 for multiplying by $(-j)^k$, where k is the sample number, and a decision circuit 12 for obtaining the sign of the real portion of the signal $y_k$ delivered by the preceding module 11;
  a clock rate error calculation circuit 13 followed by a correction circuit 14 which delivers a controlling clock signal H; and
  a phase error calculation circuit 15 followed by a correction circuit 16 which delivers a phase error correction signal.

The demodulator 10 is a conventional four phase state demodulator in which the intermediate frequency signal $x(t)$ or the microwave signal itself is directly demodulated, is split into two signals, one using a real path and the other an imaginary path, each path respectively comprising a ring modulator 30 (31), a filter 32 (33), and a sampling circuit 34 (35) which is an analog-to-digital converter.

The output from this demodulator provides a signal $x_k$ having a real component $x_k^c$ and an imaginary component $x_k^s$, such that $x_k + x_k^c + jx_k^s$.

This four-phase demodulator 10 is shown in order to situate the synchronizing circuit within the reception chain.

The signals on the real and imaginary paths are digitized at the bit rate H, and the resulting samples are considered as being complex numbers.

The processor module comprises a modulo-4 counter 36 followed by a multiplier 37 for obtaining the value $(-j)^k$ which is applied to the complex multiplier 38 such that its output provides $y_k = (-j)^k \cdot x_k^c + jy_k^s$.

Thus, the processor module receives samples $x_k$ of interest which alternate on two paths and it derives therefrom:

a sequence of useful samples ($y_k^c$) on the real path and constituting decision variables; and a sequence of samples ($y_k^s$) on the imaginary path and useful for phase and clock synchronization purposes.

The samples $x_k$ are thus multiplied by $(-j)^k$ where k is generated by the modulo-4 counter which increments at the bit rate. The multiplication is performed by a multiplier 38 constituted by a set of logic circuits.

The decision circuit 12 is used to obtain a signal $d_k$ which is the sign of the real portion of $y_k$, which sign constitutes the decision concerning the transmitted signals (to within the error due to differential decoding).

Circuits 20, (21), 22, 23, and 24 are delay circuits each providing a delay of 1 bit period for deriving the signals $y^s k_{k-1}$, $y^c_{k-1}$, $d_{k-1}$, and $d_{k-2}$ from the signals $y_k^s$, $y_k^c$, $d_k$, and $d_{k-1}$, respectively.

The delay circuits 23 and 24 and the decision circuit 12 may each be constituted by a respective D-type bistable, for example.

However, the delay circuits 20, 21, and 22 for obtaining $y^s_{k-1}$, $y^s_{k-1}$, and $y^c_{k-1}$ respectively may be constituted by n D-type bistables in parallel (where n is a number depending on the number of output bits delivered by the converters 34 and 35).

The clock rate error calculating circuit 13 comprises an adder 34 and a multiplier 40 and serves to calculate the error voltage of the clock loop as follows: $e^r_k = -y^s_{k-1} \cdot (d_k + d_{k-2})$, which voltage is applied to the correction circuit 14 which is constituted by a filter 41 followed by a voltage controlled oscillator 42 (VCO) which delivers a controlling clock signal H, used, in particular, in all of the synchronous circuits.

In the module 11 for performing complex multiplication by $(-j)^k$, k is incremented for each period of the bit frequency clock. This operation serves to put all of the decision variables onto the real path (as in BPSK) even though these variables, prior to multiplication, are spread over the real path at instants $2kT$ and the imaginary path at instants $2(k+1)T$, where T is the bit time.

This operation considerably reduces the complexity of the circuits downstream therefrom, and in particular it simplifies the phase and clock synchronizing circuits.

The clock servo-control loop operates using the known "advance/retard" principle. However, this circuit is particularly simple by virtue of the multiplication by $(-j)^k$.

The phase error calculating circuit 15 comprises an adder 44, a subtractor 45, and two multipliers 46 and 47 for calculating the phase loop error voltage as follows:

$$e^p_k = g1(d_{k-2} - d_k)y^c_{k-1} + d_{k-1} \cdot y^s_{k-1}$$

which voltage is applied to the correction circuit 16 which comprises a filter 48 followed by a VCO 49 that delivers an analog control voltage to the demodulator 10.

$g1 = g(T)$, where T represents the bit time, and $g(t)$ is the overall impulse response of the filtering to which the signal is subjected. $g(t)$ is assumed to be even and to satisfy the Nyquist criterion (i.e. $g(2kT) = 0$ for $k = 0$ and $g(0) = 1$).

For OQPSK, $g1 \approx 0.5$, thereby making it possible to simplify the value of $e_k^p$ which is reduced to mere addition. For MSK, $g1 \approx 0.13$.

Figure 2:
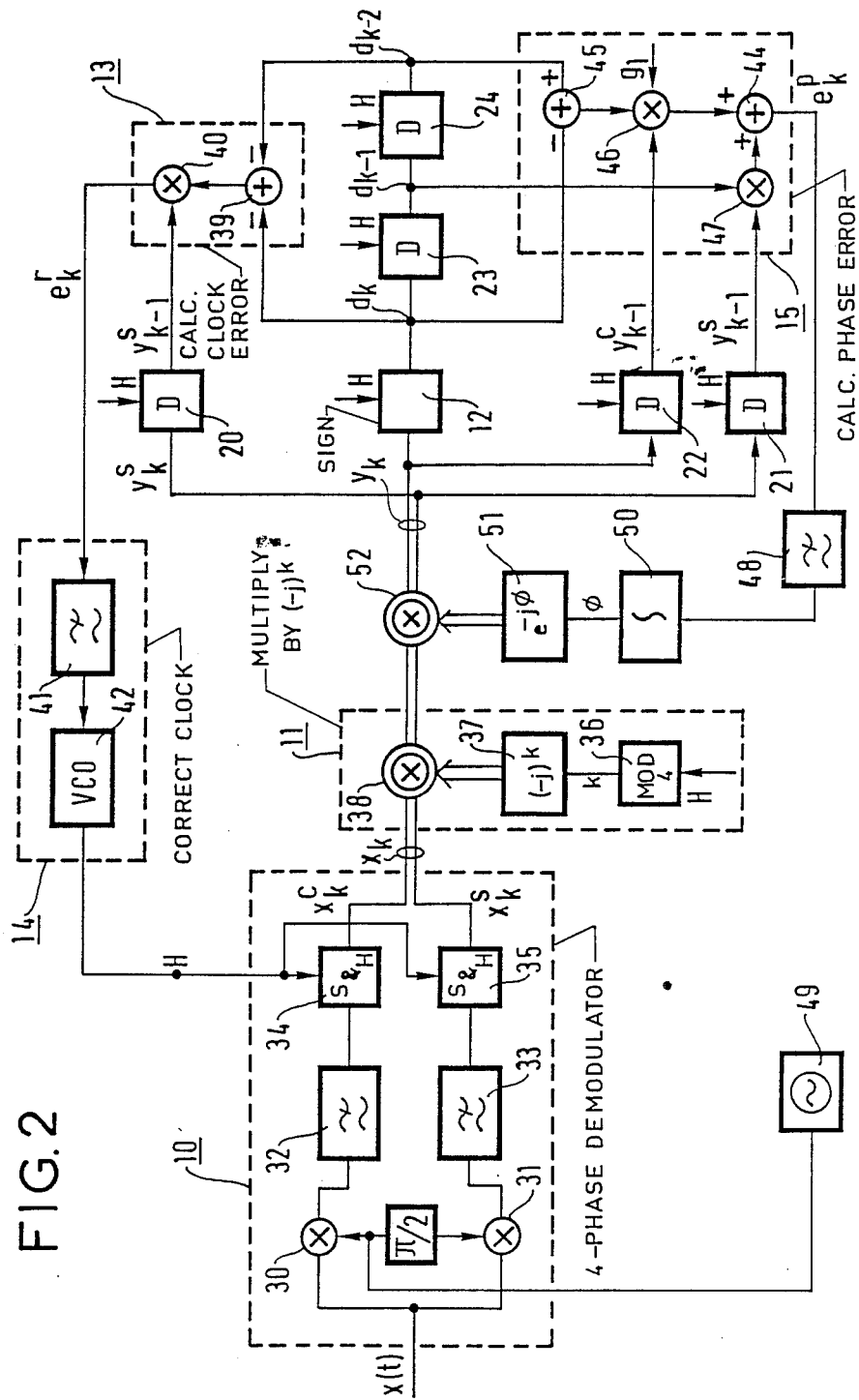
FIG. 2 is a block diagram of a variant circuit in accordance with the invention.

In FIG. 2, items which are identical to items in FIG. 1 have the same reference numerals.

In this variant circuit of the invention, phase loop correction is performed on the sampled signals.

Thus, the phase error voltage $e_k^p$ is applied to the filter 48 as before, but its output is now connected to a digital integrator 50 which delivers a value $\phi$ to a circuit 51 for calculating $e^{-j\phi}$ which is applied to a second complex multiplier 52 connected to the output of the first complex multiplier 38 described above.

The oscillator circuit 49 is no longer connected to the filter 48 and is therefore no longer voltage controlled, and thus constitutes a synthesizer connected to the demodulator 10.

Naturally, the present invention has been described and shown merely by way of preferred example and its various component parts could be replaced by equivalents without thereby going beyond the scope of the invention.

I claim:

1. A synchronizing circuit for offset quaternary phase shift keying, comprising:

a four-phase demodulator for providing a demodulated signal sample $x_k$ sampled at bit time k and having a real component $x_k^c$ and an imaginary component $x_k^s$;

a processing module responsive to the real and imaginary components of the output of the four-phase demodulator for deriving from each signal sample $x_k$ a corresponding useful sample $y_k^c$ on a real path and a corresponding synchronization sample $y_k^s$ on an imaginary path, and deriving from each useful sample $x_k$ a corresponding decision variable $d_k$ equal to the sign of the useful sample $y_k^c$;

a phase error calculating circuit responsive to the output of the processing module for deriving a phase loop error correction signal $g1(d_{k-2} - d_k)y_{k-1}^c + d_{k-1} \cdot y_{k-1}^s$ where $y_{k-1}^c$ is $y_k^c$ shifted by one bit period, $y_{k-1}^s$ is $y_k^s$ shifted by one bit period, $d_{k-2}$ is $d_k$ shifted by two bit periods, $d_{k-1}$ is $d_k$ shifted by one bit period, $g1 = g(T)$, T is the bit period, and $g(t)$ is the overall impulse response of the filtering to which the signal is subjected; and a phase correcting circuit responsive to the phase loop error correction signal for changing the phase of the useful sample.

2. A circuit according to claim 1, wherein the phase correcting circuit comprises a VCO and a filter and the phase loop error correction signal is applied to the VCO via the filter in order to provide analog control to the demodulator.

3. A circuit according to claim 1, wherein the phase correcting circuit comprises a digital integrator for delivering a signal $\phi$, a filter, a circuit for calculating $e^{-j\phi}$, and a complex multiplier responsive to the output of the demodulator in order to change the phase of the real portion of the demodulated signal.

4. A circuit according to claim 1, further comprising:
a clock error calculating circuit responsive to the output of the processing module for deriving a clock loop error signal and
a clock correction circuit responsive to the clock loop error signal for changing the bit period at which the demodulated signal is sampled.

5. A circuit according to claim 4, wherein the clock loop error signal is $$-y_{k-1}^s \cdot (d_k + d_{k-2})$$

where
$-y_{k-1}^s$ is the imaginary part of $y_{k-1}$ shifted by one bit period, and
$d_{k-2}$ is $d_k$ shifted by two bit periods.

6. A synchronizing circuit for offset quaternary phase shift keying, comprising:
a four-phase demodulator for providing a demodulated signal sample $k_x$ sampled at bit time k and having a real component $x_k^c$ and an imaginary component $x_k^s$;
a processing module responsive to the real and imaginary components of the output of the four-phase demodulator for multiplying each signal sample $x_k$ by $(-j)^k$ to form $x_k \cdot (-j)^k$ and for deriving therefrom a corresponding useful sample $y_k^c$ on a real path and a corresponding synchronization sample $y_k^s$ on an imaginary path;
a phase error calculating circuit responsive to the output of the processing module for deriving a phase loop error correction signal; and
a phase correcting circuit responsive to the phase loop error correction signal for changing the phase of the useful sample.

7. A circuit according to claim 6, wherein the processing module further comprises a decision circuit for deriving a decision variable equal to the sign of the useful sample $y_k^c$.

* * * * *

UNITED STATES PATENT AND TRADEMARK OFFICE
CERTIFICATE OF CORRECTION

PATENT NO. : 4,949,357
DATED : August 14, 1990
INVENTOR(S) : Philippe Sehier

It is certified that error appears in the above-identified patent and that said Letters Patent is hereby corrected as shown below:

Column 2, line 4, change "$(d_{-2}-d_k)$" to -- $(d_{k-2}-d_k)$ --.

Column 3, line 3, change "$x_k+x_k^c+jx_k^s$" to -- $x_k=x_k^c+jx_k^s$ --.

Column 3, line 32, change "$y^s k_{k-1}$" to -- $y^s_{k-1}$ --.

Column 6, line 4, change "$k_x$" to -- $x_k$ --.

Signed and Sealed this

Twenty-first Day of April, 1992

Attest:

HARRY F. MANBECK, JR.

*Attesting Officer*      *Commissioner of Patents and Trademarks*